Dec. 27, 1938.  J. HONRINE  2,141,392
PHOTOENGRAVING CAMERA
Filed Sept. 20, 1937  2 Sheets-Sheet 1
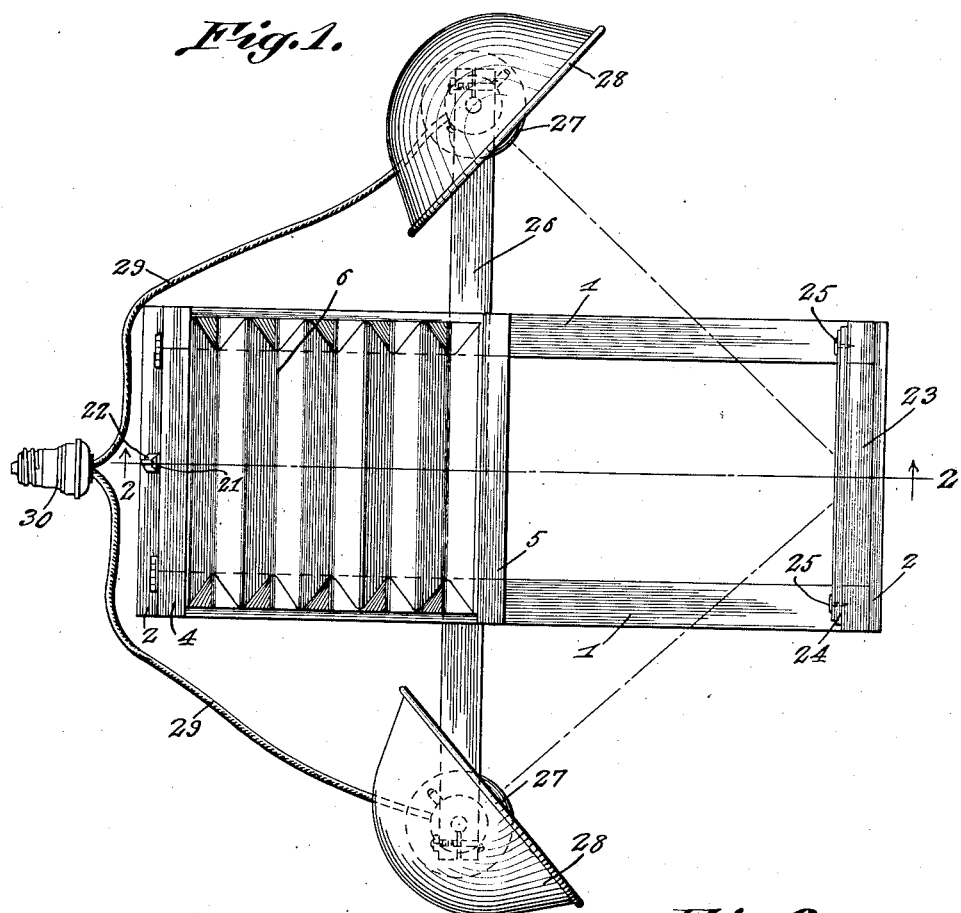
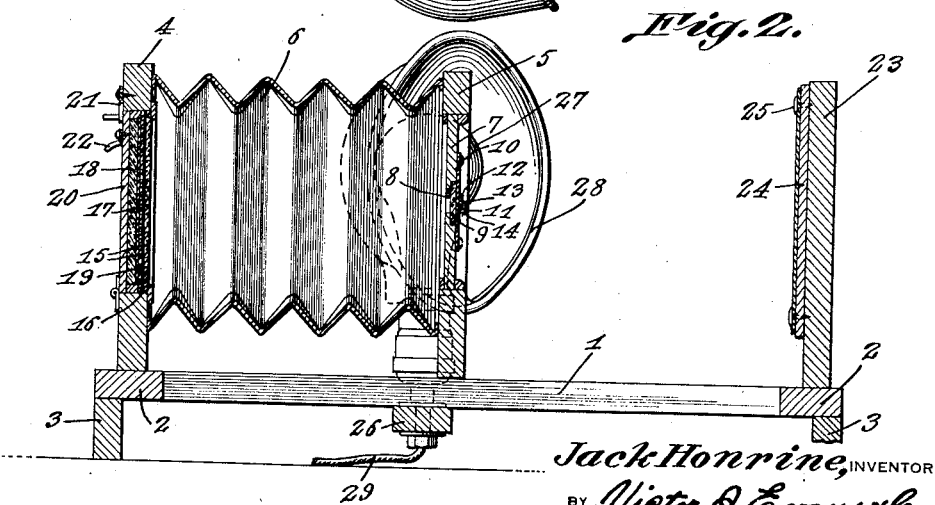
Jack Honrine, INVENTOR
BY Victor J. Evans & Co.
ATTORNEYS Dec. 27, 1938.  J. HONRINE  2,141,392
PHOTOENGRAVING CAMERA
Filed Sept. 20, 1937    2 Sheets-Sheet 2
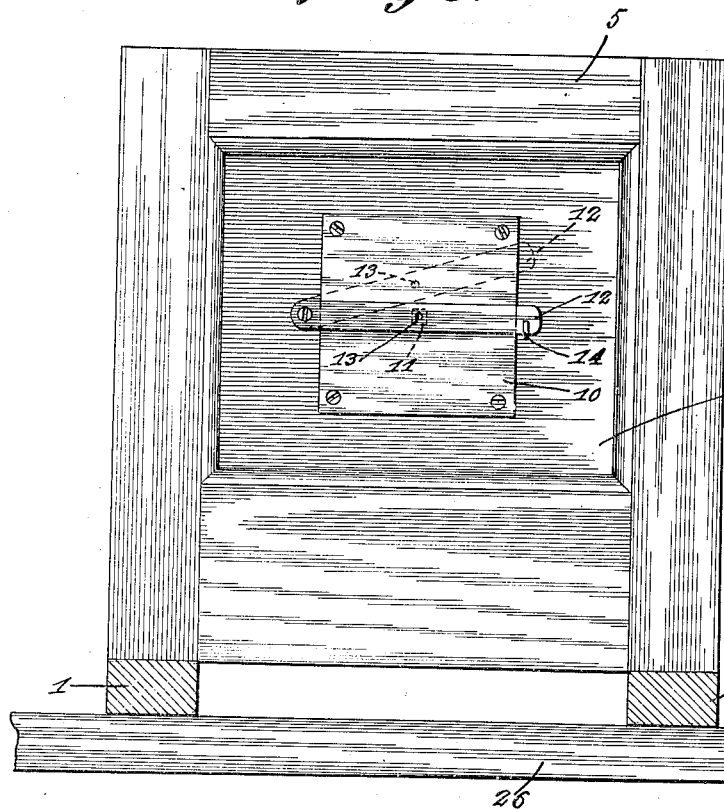
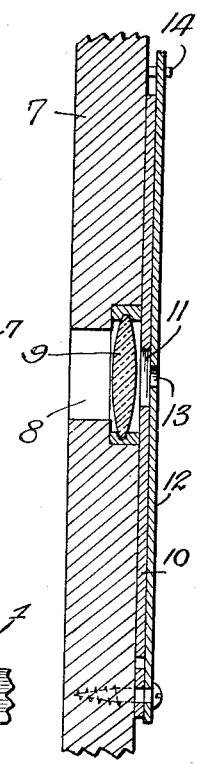
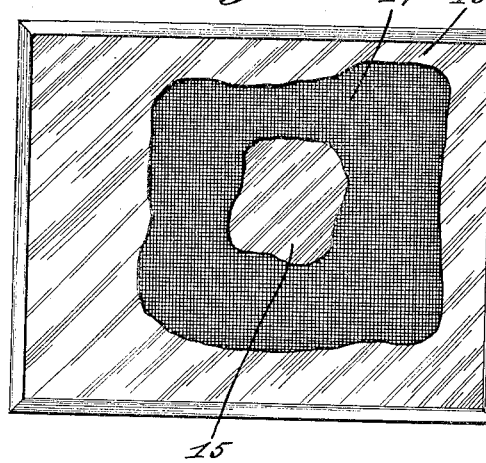
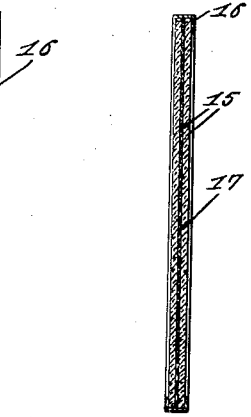
Jack Honrine, INVENTOR
BY Victor J. Evans & Co.
ATTORNEYS Patented Dec. 27, 1938

2,141,392

UNITED STATES PATENT OFFICE 2,141,392

PHOTOENGRAVING CAMERA

Jack Honrine, New Bern, N. C.

Application September 20, 1937, Serial No. 164,769

1 Claim. (Cl. 88—24)

This invention relates to cameras, and its general object is to provide a camera which is not only capable of assuring excellent results in the photographic preparation of reproductions of copy for use in making plates, blocks or the like employed in photo-engraving work of various characters, but is extremely easy to operate, in that it includes a single lens, and none of the usual adjustments are necessary, because the focus is fixed, the stop size and screen distance are likewise fixed or invariable, and the time of exposure is never changed, yet the camera produces half tone negatives for the use set forth that are uniformly perfect in all details.

A further object is to provide what may be termed a photo-engraving camera, that is simple in construction, inexpensive to manufacture and extremely efficient in operation, use and service.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a top plan view of the camera which forms the subject matter of the present invention.

Figure 2 is a sectional view taken approximately on line 2—2 of Figure 1, looking in the direction of the arrows.

Figure 3 is a front view of the camera, with the lamp supporting bar broken away and the frame bars in section.

Figure 4 is a fragmentary view of the screen member.

Figure 5 is a vertical sectional view taken through the screen member.

Figure 6 is a horizontal sectional view taken through the lens and stop control means therefor.

Referring to the drawings in detail, it will be noted that the base of my camera is in the form of an elongated frame which includes a pair of spaced parallel bars 1 and end bars 2 bridging and connected to the ends of the bars 1. The end bars have secured to and depending therefrom supporting strips 3 for elevating the camera above suitable supporting means as will be apparent.

The body of my camera includes a rear end frame member 4 and an inner or intermediate frame member 5, both of which are fixed to the base frame and rise therefrom as best shown in Figure 2.

Bridging the frame members 4 and 5 and having its ends secured thereto is a bellows 6, which of course is stationary in view of the fact that the frame members 4 and 5 are fixed. That feature is rather unique, but a bellows has proven very satisfactory for the purpose intended, in that it eliminates any possibility of reflections, which is encountered to some degree with cameras having straight, smooth walls.

Secured to and filling the opening of the inner frame member 5 is a panel 7 having a lens opening 8 centrally arranged therein and within which is mounted a lens 9 that is held accordingly by a stop plate 10, the latter being fixed to the panel by screws, on the outer side thereof, as best shown in Figure 3, and the plate 10 has a centrally arranged square stop opening 11 therein, which is likewise centrally arranged with respect to the lens 9, as best shown in Figure 6.

Mounted on the panel 7 and having one end pivotally secured thereto is what is termed a flash bar or strip 12 that is provided with a minute round stop opening 13 to register with the square stop opening 11, as best shown in Figure 3 and the flash bar is supported in operative position in a manner to bridge the plate 10 by a catch hook 14.

The rear end frame member has fixed therein for closing the opening thereof a screen member mounted in the front portion thereof, as shown in Figure 2, and the screen member in the form as shown includes a pair of transparent glass plates 15 secured together by binding material 16 in face to face relation with a screen 17 between the same. The screen is preferably made from Celluloid but of course it can be of any suitable material and be of any line ruling or pitch required. The screen member is held fixed within the frame member 4 by molding strips as shown, and the inner molding strips provide a frame for a glass plate 18 that is removably mounted therein and which is designed for holding the film which is indicated by the reference numeral 19, against the screen member. Cooperating with the plate 18 is a cover 20 that is hinged at its lower end to the frame member 4 and fits the opening thereof for completely closing the same, as shown in Figure 2. The cover 20 is held in closed position by a pivoted latch 21 provided with a handle as shown, and a handle 22 is likewise provided for the cover.

Secured to the front end bar 2 and rising therefrom is a copy mounting board 23 which may be of the usual construction and I have illustrated a board that includes a soft panel 24 to receive tacks 25, the latter being for the purpose of securing copy such as pictures and the like to the board, as shown.

Bridging the underside of the parallel bars 1 and extending a considerable distance from the opposite sides thereof is a cross bar 26 which has mounted on the ends thereof lamp sockets receiving lamps 27 and the sockets have likewise secured thereto reflectors 28, for directing the rays of light from the lamps toward the mounting board, as best shown in Figure 1. The lamps are provided with conductors 29 that are connected to the usual plug members 30.

In the use of my camera, a photograph or the like is tacked on or otherwise secured to the copy board, and then the film is placed in position as shown in Figure 2, between the plate 18 and the screen member, while my camera is shown as being constructed in a manner which necessitates it being loaded in a dark room, it will be obvious that suitable provision can be made for otherwise loading the same.

When the camera is loaded, the flash bar or strip is moved to its inoperative position, as suggested in dash lines in Figure 3, and then the lamps are turned on for a one minute exposure through the square stop opening 11. At the end of that time, the flash bar is moved to operative position as shown in full lines in Figure 3, and the photo is covered with a white sheet or blotter. The exposure is then made through the round stop opening for thirty seconds. The second exposure is of course to put dots in the shadow sections of the film, as will be apparent. The film is then removed and developed in the usual manner for use in the photo-engraving process.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

In a photo-engraving camera, a fixed object holder, illuminating means therefor, a fixed screen and sensitive material holder and a fixed lens holder, the latter including a frame member, a panel closing the frame member and having an opening centrally arranged therein, a lens mounted in the opening, a plate secured to the panel in engagement therewith and having a square opening therein providing a stop and registering with the lens opening, a flash bar pivoted at one end to the panel and having a minute round opening therein providing a stop, and a hook secured to the panel in alignment with the pivot point of the flash bar for supporting the opposite end of the latter with the opening thereof in registration with the square opening.

JACK HONRINE.